(12) United States Patent
Oztekin et al.

(10) Patent No.: US 7,440,968 B1
(45) Date of Patent: Oct. 21, 2008

(54) QUERY BOOSTING BASED ON CLASSIFICATION

(75) Inventors: Bilgehan Uygar Oztekin, Mountain View, CA (US); Sepandar D. Kamvar, San Francisco, CA (US); Taher H. Haveliwala, Mountain View, CA (US); Glen Jeh, San Francisco, CA (US); Tessa Macduff, Redwood City, CA (US)

(73) Assignee: Google Inc., Mountain View, CA (US)

( * ) Notice: Subject to any disclaimer, the term of this patent is extended or adjusted under 35 U.S.C. 154(b) by 374 days.

(21) Appl. No.: 11/001,403

(22) Filed: Nov. 30, 2004

(51) Int. Cl.
*G06F 17/30* (2006.01)
(52) U.S. Cl. .................. 707/102; 707/3; 707/7
(58) Field of Classification Search ........ 707/3, 707/102, 10
See application file for complete search history.

(56) References Cited

U.S. PATENT DOCUMENTS

| | | | | |
|---|---|---|---|---|
| 6,078,916 A * | 6/2000 | Culliss | ................. | 707/5 |
| 6,584,466 B1 * | 6/2003 | Serbinis et al. | ............ | 707/10 |
| 6,606,659 B1 * | 8/2003 | Hegli et al. | ............ | 709/225 |
| 6,691,108 B2 * | 2/2004 | Li | ................. | 707/3 |
| 6,839,680 B1 * | 1/2005 | Liu et al. | ............ | 705/10 |
| 6,873,982 B1 * | 3/2005 | Bates et al. | ............ | 707/5 |
| 7,020,646 B2 * | 3/2006 | Brexel et al. | ............ | 707/1 |
| 2002/0078045 A1 * | 6/2002 | Dutta | ............ | 707/7 |
| 2004/0030686 A1 * | 2/2004 | Cardno et al. | ............ | 707/3 |
| 2005/0033803 A1 | 2/2005 | Vleet et al. | ............ | 709/203 |
| 2005/0203884 A1 * | 9/2005 | Allen et al. | ............ | 707/3 |
| 2005/0222989 A1 * | 10/2005 | Haveliwala et al. | ............ | 707/3 |
| 2005/0240580 A1 * | 10/2005 | Zamir et al. | ............ | 707/4 |
| 2006/0041549 A1 * | 2/2006 | Gundersen et al. | ............ | 707/5 |
| 2006/0059138 A1 * | 3/2006 | Milic-Frayling et al. | ....... | 707/3 |

* cited by examiner

*Primary Examiner*—Debbie M Le
(74) *Attorney, Agent, or Firm*—Morgan, Lewis & Bockius LLP

(57) ABSTRACT

In a method of generating a search boost vector, a first set of content location identifiers for first content are provided. A second set of content location identifiers for second content are identified. The second content is related to the first content in accordance with one or more first categories corresponding to the first content. The one or more first categories may be determined by applying a text classifier to the first content. The second content may also be identified based on one or more user profiles and/or one or more content site profiles. The search boost vector is generated using weights corresponding to the content location identifiers in the first set of content location identifiers and/or the second set of content location identifiers. The one or more search boost vectors may be used to boost one or more search results.

38 Claims, 14 Drawing Sheets

| User Identification | Time Stamp | URL | Other Fields | |
|---|---|---|---|---|
| User 1 | 12.05 | URL A | | 510_1 |
| User 1 | 12.10 | URL B | | 510_2 |
| ⋮ | ⋮ | ⋮ | ⋮ | |
| User N | 19.30 | URL M | | 510_3 |

Figure 5

QUERY BOOSTING BASED ON CLASSIFICATION

FIELD OF THE INVENTION

The present invention relates to providing search results from search engines, such as Internet and Intranet search engines, and in particular to promoting the rankings of selected search results.

BACKGROUND

Search engines provide a powerful tool for locating documents in a large database of documents, such as the documents on the Internet or World Wide Web (WWW), or the documents stored on the computers of an Intranet. The documents are located in response to a search query submitted by a user. A search query may consist of one or more words, terms, keywords, phrases and/or combinations thereof.

Returning search results that closely match, or ideally, that do match a user's interests is a desired characteristic of search engines. This is especially the case in the current environment where there are ever increasing amounts of information. In the absence of such capability, information overload is a real concern: search engines would return too many results to be useful. As a consequence, existing search engines employ a variety of techniques to improve the relevance of search results. Nonetheless, it is still difficult to tailor search results based on a user's profile. There is a need, therefore, for an improved technique for personalizing search engine results.

SUMMARY

In a method of generating a search boost vector, a first set of content location identifiers for first content is provided. A second set of content location identifiers for second content is identified. The second content is related to the first content in accordance with one or more first categories corresponding to the first content. The one or more first categories may be determined by applying a text classifier to the first content. The second content may also be identified based on one or more user profiles and/or one or more content site profiles. The search boost vector is generated using weights corresponding to the content location identifiers in the first set of content location identifiers and/or the second set of content location identifiers. The one or more search boost vectors may be used to boost one or more search results.

BRIEF DESCRIPTION OF THE DRAWINGS

For a better understanding of the nature and objects of the invention, reference should be made to the following detailed description, taken in conjunction with the accompanying drawings, in which:

FIG. 5 is an illustration of a URL log data structure according to some embodiments of the invention.

Like reference numerals refer to corresponding elements, components or steps throughout the several views of the drawings.

DESCRIPTION OF EMBODIMENTS

Reference will now be made in detail to the various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

One or more search results in a set of search results may be personalized by boosting the ranking of one or more of the search results for a user performing a search on the Internet, on one or more Intranets, or on combinations of the Internet and one or more Intranets. Boosting of selected search results in a set of search results, i.e., changing a ranking or order of the selected search results, allows search results that are better aligned with a user's preferences to be presented. One way to determine the selected search results that are boosted is based on topic or category. Boosting based on topic or category offers a finer granularity, i.e., it is able to identify an underlying commonality in the user's preferences, than existing approaches to customization, which are often based on a particular item that is of interest to a user (such as a book that he or she may wish to purchase).

The topic or category may be determined in accordance with one or more key words, one or more content location identifiers, content at the one or more content location identifiers, one or more user profiles (for example, where users indicate categories of interest) and/or one or more content site profiles (which, for example, indicate relevant categories associated with content sites). The topic or category may be determined using a text classifier. The one or more key words may be associated with one or more search queries, one or more previous search results, one or more documents, the one or more user profiles and/or the one or more content site profiles. The one or more content location identifiers may include one or more uniform resource locators (URLs), and addresses or identifiers of one or more documents, one or more content pages (such as web-pages on the WWW) and one or more content sites (such as web-sites on the WWW). Henceforth, the terms "URL" or "URLs" broadly signify one or more of these alternatives. In some embodiments, the term "URL" may signify a domain name in a URL and the term "URLs" may signify domain names in URLs.

The boosting of one or more search results may use one or more search boost vectors. The one or more search boost vectors may be, at least in part, generated using the one or more categories, the one or more topics, the one or more user profiles and/or the one or more content site profiles.

Figure 1A:
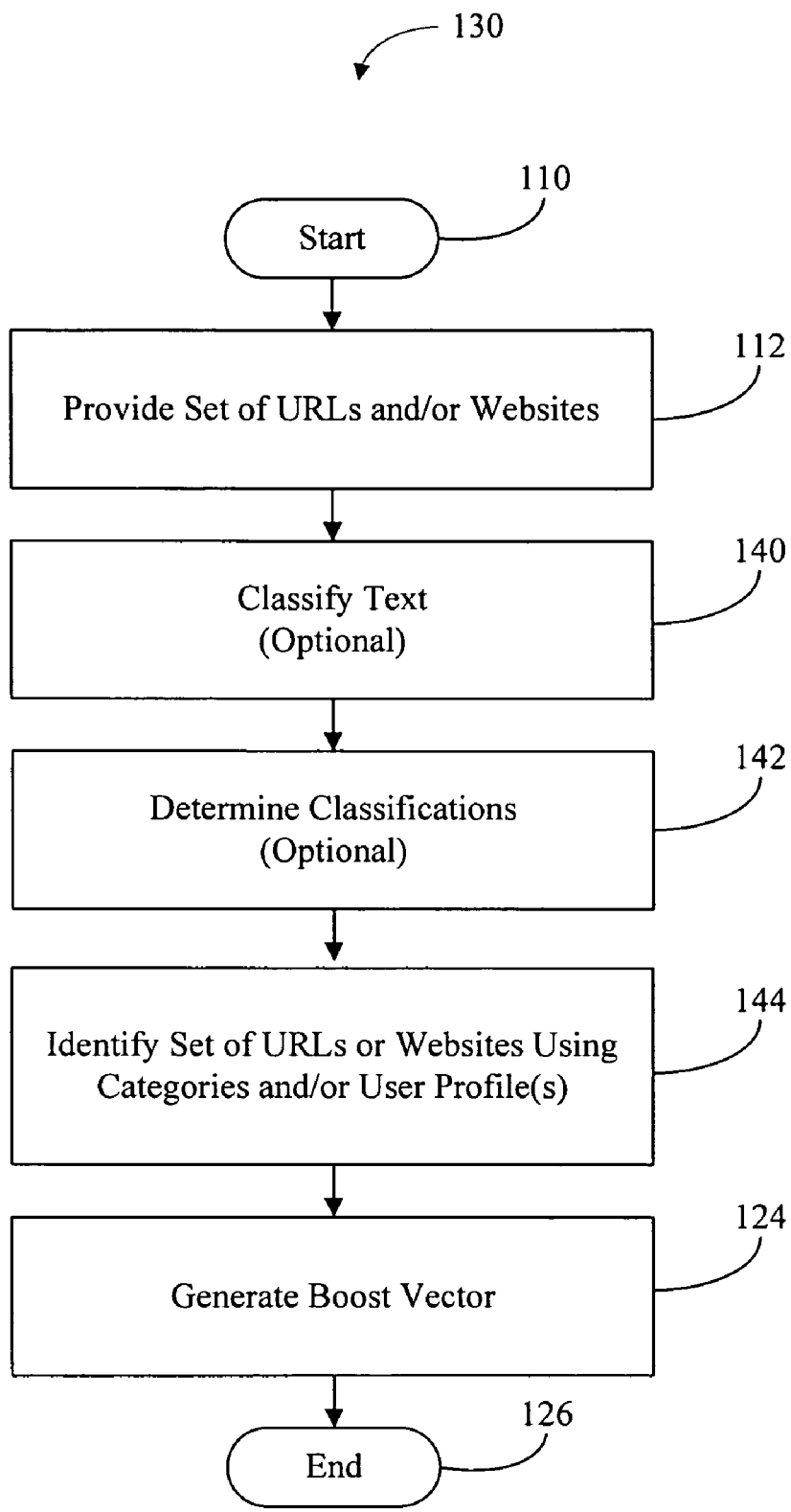
FIG. 1A is a flow chart of a method for generating one or more search boost vectors according to some embodiments of the invention.

FIG. 1A is a flow chart illustrating an embodiment of a method 130 for generating the one or more search boost vectors. After starting 100, a seed or first set of URLs for first content is provided 112. For example, the first set of URLs may be specified by the user by indicating his or her preferences, such as categories of interest. User preferences may be specified in a user profile. The user profile may contain a set of URLs, or the user profile may contain other information (e.g., keywords, identifiers of categories of information that are of interest to the user) that is then mapped to a set of URLs, or a combination of the techniques may be used. The resulting set of URLs may be used as the first set of URLs at 112. Alternately, the first set of URLs at 112 may be the URLs of a web-page or web-site from which users may submit search queries to a search engine. In another embodiment, the URLs that the user has visited (which may be listed in the user profile or in a log) may allow an associated category to be determined either using the one or more content site profiles, or by using a classifier on the content of the URLs. Content site profiles may include category information for associated URLs.

In some embodiments, the first set of URLs may be determined from existing sets of URLs associated with one or more categories. In the event that the user is associated with more than one topic, then multiple sets may be combined to create the first set. In some embodiments, the sets are combined in a weighted fashion based on a category's relative importance to the user. In other embodiments, the first set of URLs may be determined from log data for one or more user sessions. Log data may include URL log data. FIG. 5 is an embodiment of a URL Log data structure 500. The data structure 500 has multiple entries 510. Each of the entries 510, such as entry 510_1, has a user identification 512, a time stamp 514 and a URL 516. The URL 516 represents a URL visit or download by the identified user. The log data may also include cookie information. Note that cookies are typically implemented as files stored on the users' computers that indicate the users' identity or other information required by many content locations such as web-pages and web-sites. The terms "cookie" and "cookie file" may be used interchangeably. Cookies may include information such as login or registration identification, user preferences or any other information that a host at a content location sends to a user's search assistant or browser for the search assistant to return to the host at a later time. Alternatively, the log data may be collected on a login basis. The data structure 500 may also include other fields 518, such as an indication of whether a URL is selected (for example, it is clicked) from search results, the query text of the query that resulted in a click on a URL, an indication of an amount of time the user spends at a URL and, if a URL is a navigation entry, one or more links that the user followed to get to the URL.

Referring back to FIG. 1A, based on the first set of URLs, a second set of URLs for second content is identified 144. In particular, the second content is related to the first content in accordance with one or more first categories corresponding to the first content. For example, existing data structures containing sets of URLs associated with corresponding categories or topics may be accessed. The second set of URLs may also be identified in accordance with the one or more user profiles (for example, by using the categories specified) and/or the one or more content site profiles (for example, by using the associated categories).

In some embodiments, one or more first categories corresponding to the first content are optionally determined. Text in the first content is optionally classified 140 using a text classifier. Using the text classifications, the category classifications corresponding to the one or more first categories are optionally determined 142. In an exemplary embodiment, the category classifications may be determined using a category data structure that maps text classification weights to category classification weights.

The second set of URLs may be selected from one or more existing sets of URLs corresponding to one or more of the first categories. For example, the search engine system may access previously stored information that maps predefined categories to sets of URLs. By accessing the stored information for the first categories, the second set of URLs is identified. In some embodiments, the second set of URLs may correspond to at least a portion of the first set of URLs.

The search boost vector is generated by using or determining weights or relevance scores corresponding to URLs in the first set of URLs and/or the second set of URLs 124 and the procedure ends 126. A suitable data structure for storing a search boost vector is discussed below with reference to FIG. 10. In some embodiments, the method 130 illustrated in FIG. 1A may omit one or more operations, may reorder one or more operations or may include one or more additional operations.

In some embodiments, the weights or relevance scores corresponding to URLs in the first set of URLs and/or the second set of URLs may be determined. For example, the weights corresponding to the URLs in the first set of URLs and/or the second set of URLs are a measure of a frequency of occurrence of the corresponding URLs. In some embodiments, one or more of the weights may be normalized according to various criteria. For example, one or more weights may be multiplied by an inverse document frequency that reduces those weights corresponding to URLs that are visited by a larger number of users across multiple categories. Such a normalization may reduce the weights corresponding to popular URLs that are visited often irrespective of their relationship to one or more of the first categories corresponding to the first content. In other embodiments, the weights corresponding to one or more URLs may be determined by the text classifier and/or based on the category data structure.

Figure 9:
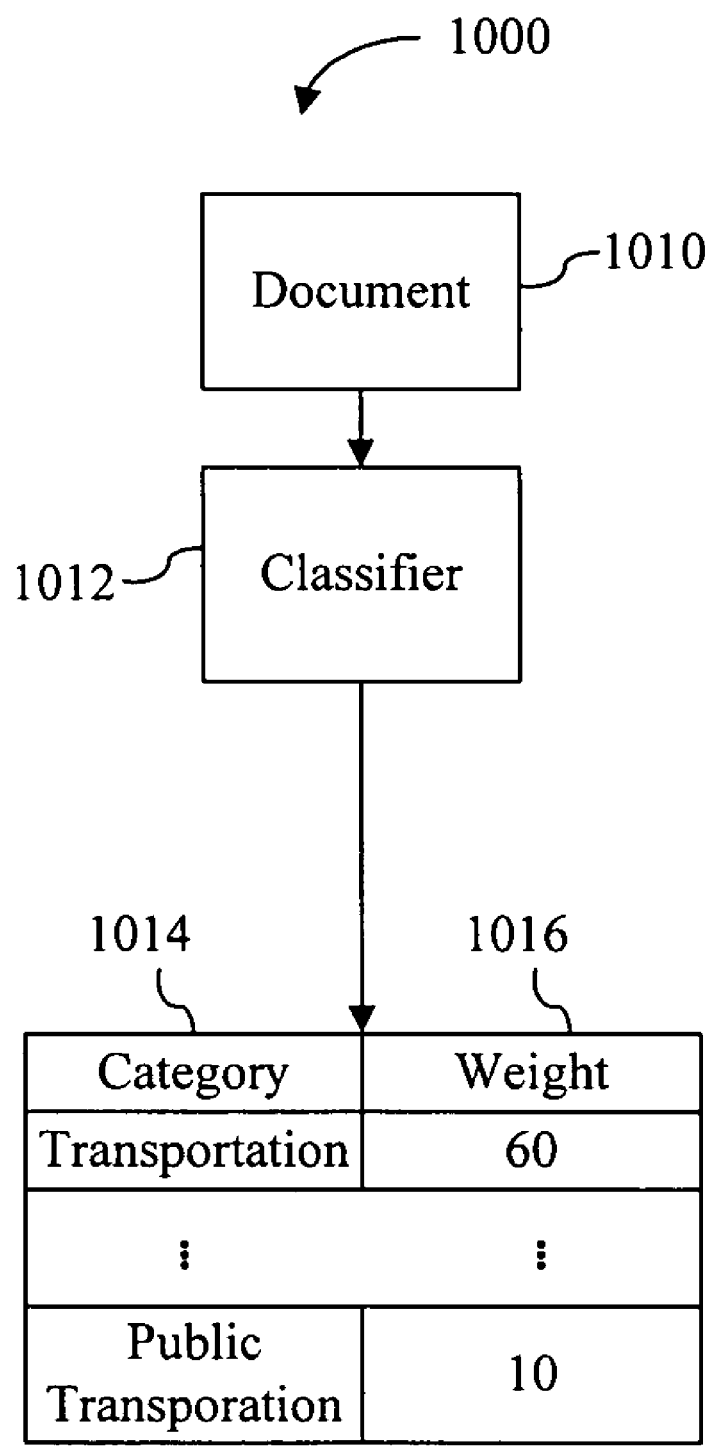
FIG. 9 is an illustration of a document classifier according to some embodiments of the invention.

As noted previously, determination of the one or more first categories may be performed using the text classifier. FIG. 9 illustrates a classification process 1000. A document 1010 is input to a classifier 1012. The classifier 1012 outputs one or more categories 1014 corresponding to the content of document 1010 along with associated weights 1016. Text classifiers, such as the text classifier 1012, are well known in the art. In one embodiment of the invention, the text classifier 1012 is a Naive Bayes classifier. The weights 1016 may be used in determining the weights of the content locations in one or more of the search boost vectors.

From the preceding description, several mapping operations may be used in determining categories associated with particular content and/or URLs. In addition, there may be a mapping from categories to associated URLs in order to determine one or more boost vectors. In some embodiments, these mapping operations may use one or more data structures, such as those illustrated in FIGS. 8A-8D. In some embodiments, the data structures may allowing mapping information to be accessed based on a binary or tree search. In some embodiments, the data structures may include a hash table.

Figure 8A:
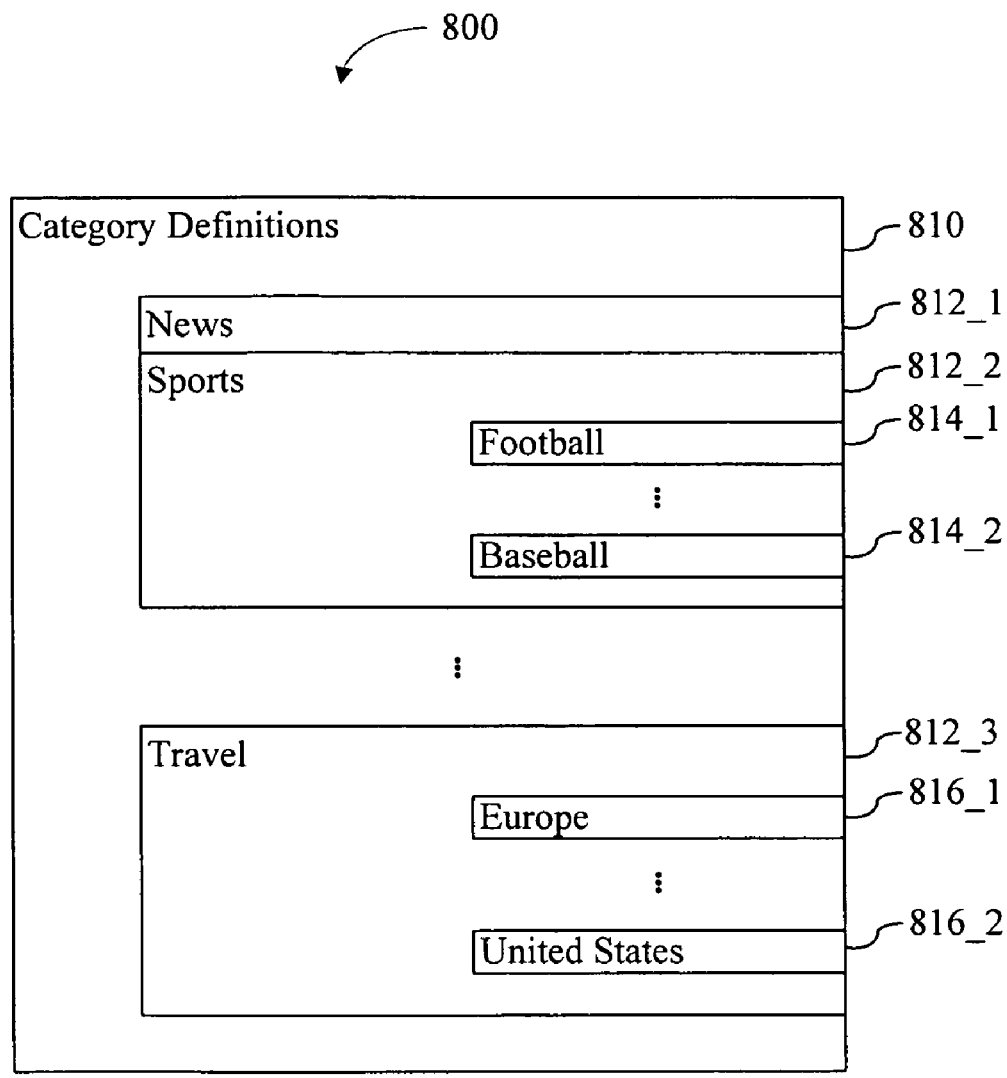
FIG. 8A is an illustration of a category definition data structure.

FIG. 8A illustrates an embodiment of a category structure 800, including category definitions 810 and categories 812. Categories, such as category 812, may contain subcategories, such as subcategories 814 and 816. One or more of the categories 812 and/or subcategories 814 and 816 may include a set of one or more associated URLs and corresponding weights. This information may be used to determine the second set of URLs in the method 130 (FIG. 1A) and/or the weights in one or more search boost vectors. Category structure 800 should be understood to be an illustration of a general structure that may include multiple levels of subcategories in a hierarchy. While FIG. 8A only shows two such levels, there may be three or more levels.

Figure 8B:
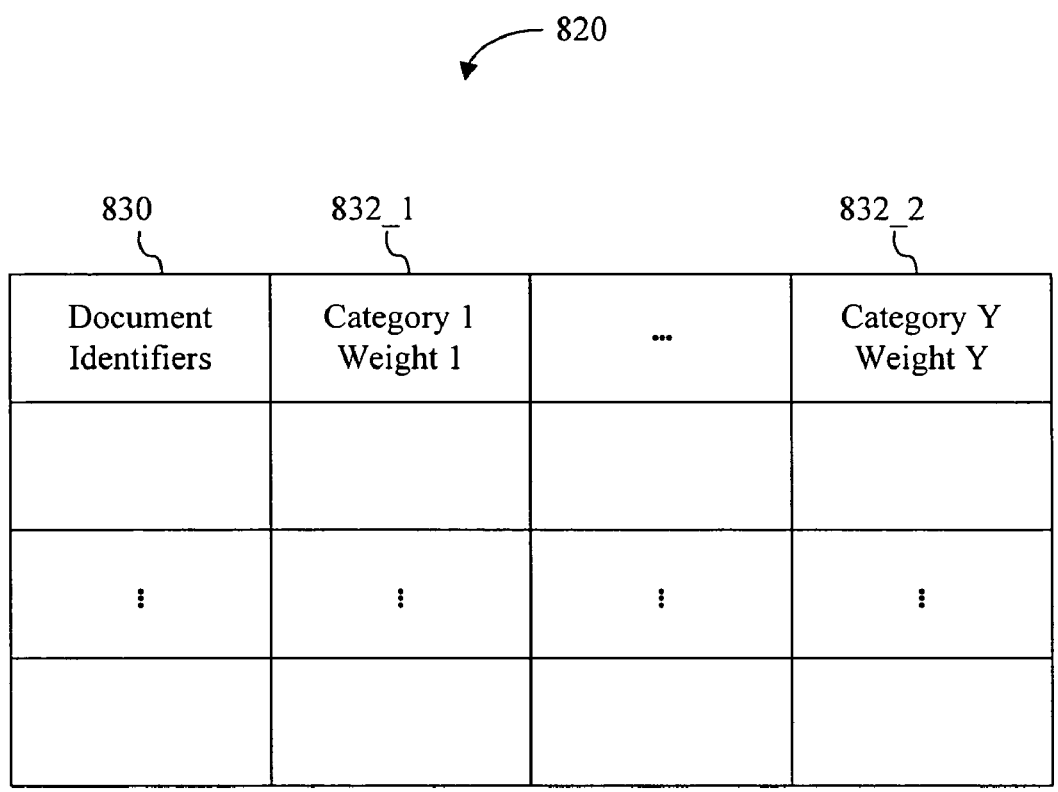
FIG. 8B is an illustration of a document dictionary data structure according to some embodiments of the invention.

FIG. 8B illustrates an embodiment of a URL or document dictionary data structure 820. The document dictionary data structure 820 may include document identifiers 830 and category weights 832. If a new category that is not in the document dictionary data structure 820 is encountered, an additional entry for the document dictionary data structure 820 may be determined using entries for other categories and/or URL-based category weights. The document dictionary data structure 820 may be generated by applying a text classifier, such as the text classifier 1000 (FIG. 9), to one or more documents. The documents dictionary data structure 820 may be used to map a document to one or more categories.

Figure 8C:
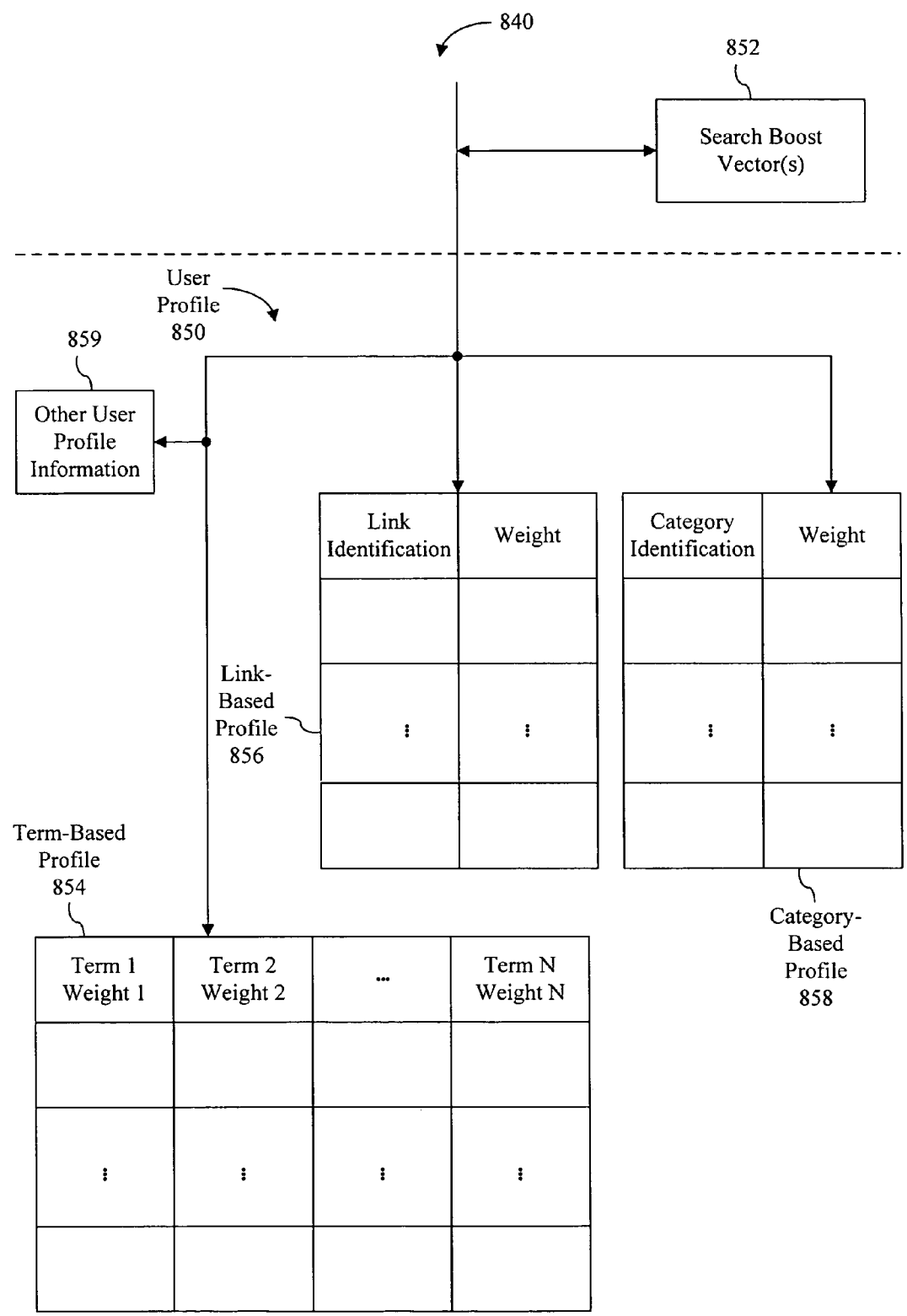
FIG. 8C is an illustration of a user profile data structure according to some embodiments of the invention.

FIG. 8C is an embodiment 840 of a user profile data structure 850. The user profile data structure 850 may include a term-based profile 854, a link-based profile 856 and/or a category-based profile 858. The term-based profile 854 allows associated terms and weights to be identified. The link-based profile 856 allows associated links (such as URLs) and weights to be identified. The category-based profile 858 allows associated categories and weights to be identified. The user profile data structure 850 may also include other user profile information 859. Terms, URLs and/or categories may be used to determine one or more search boost vectors, such as in the method 130 (FIG. 1A). Alternatively, terms and/or links may be used to boost one or more search results directly (see below). The user profile data structure 850 may also include or be linked to one or more existing search boost vectors 852 or pointers to one or more search boost vectors 852 associated with the user profile data structure 850. In these embodiments, one or more of the existing search boost vectors 852 may be used to boost one or more search results for the user or users associated with the user profile data structure 850.

Figure 8D:
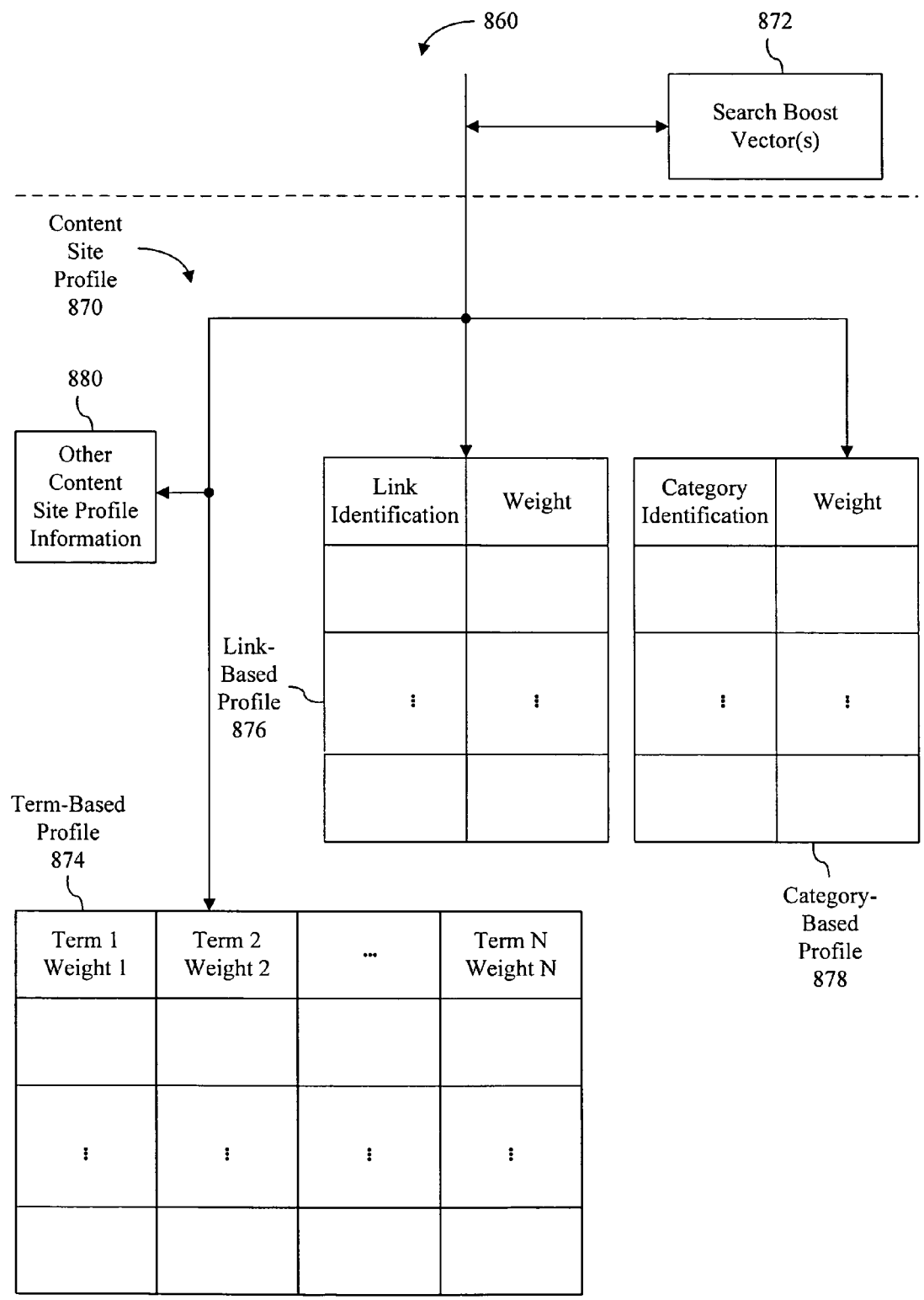
FIG. 8D is an illustration of a content site profile data structure according to some embodiments of the invention.

FIG. 8D is an embodiment 860 of a content site profile data structure 870. A content site profile indicates, directly or indirectly, one or more categories associated with a website, webpage, additional group of content or other content source. Boost vector(s) 872 associated with the content site profile may be used to boost search results considered most likely to be of interest to users of a corresponding website or other content source. The content site profile data structure 870 may include a term-based profile 874, a link-based profile 876 and/or a category-based profile 878. The term-based profile 874 allows associated terms and weights to be identified. The link-based profile 876 allows associated links (such as URLs) and weights to be identified. The category-based profile 878 allows associated categories and weights to be identified. The content site profile data structure 870 may also include other content site profile information 880. Terms, URLs and/or categories may be used to determine one or more search boost vectors, such as in the method 130 (FIG. 1A). Alternatively, terms and/or links may be used to directly boost one or more search results for one or more users (see below). The content site profile data structure 870 may also include or be linked to one or more existing search boost vectors 872 or pointers to one or more search boost vectors 872 associated with the content site profile data structure 870. In these embodiments, one or more of the existing search boost vectors 872 may be used to boost one or more search results for one or more users.

Figure 10:
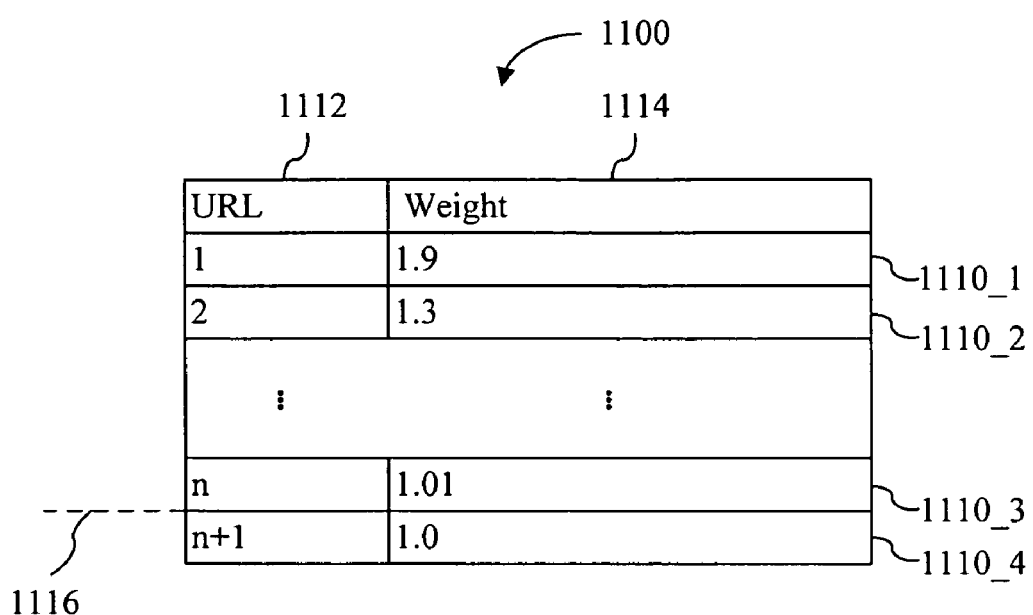
FIG. 10 is an illustration of a search boost vector according to some embodiments of the invention.

FIG. 10 illustrates an embodiment of a search boost vector 1100 generated using the method 130 (FIG. 1A). The search boost vector 1100 has multiple entries 1110. Each entry 1110, such as entry 1110_1, has a URL 1112 and a corresponding weight 1114. In some embodiments, the search boost vector may be truncated 1116. In this way, only the entries 1110 having weights larger than a threshold or the entries 1110 with rank values exceeding a threshold may be included in the search boost vector 1100.

The search boost vector 1100 may be used to personalize one or more search results. As discussed previously, the search boost vectors may be identified or determined based on one or more key words, one or more URLs, content at the one or more URLs, one or more user profiles and/or one or more content site profiles. Boosting search results using one or more search boost vectors that are identified or determined based on one or more user profiles or preferences is often referred to as personalized search. Boosting search results using one or more search boost vectors that are identified or determined based on one or more content site profiles is sometimes referred to as content site flavored search. In this discussion, personalized search results indicate personalized search and/or content site flavored search.

Figure 1B:
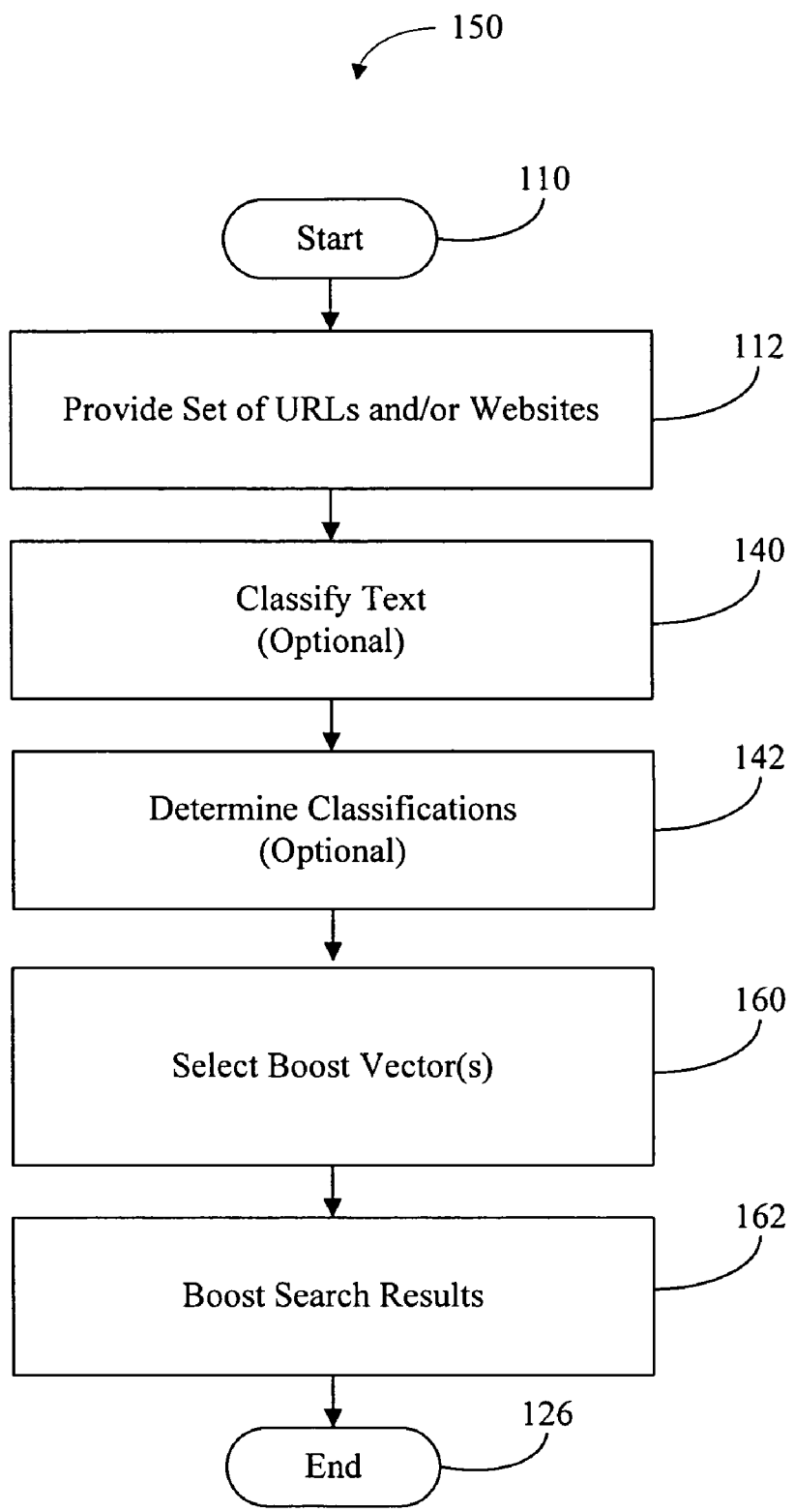
FIG. 1B is a flow chart of a method for using one or more search boost vectors to boost one or more search results from a search engine according to some embodiments of the invention.

FIG. 1B is a flow chart illustrating an embodiment of a method 150 for using one or more search boost vectors to boost one or more search results. A set of URLs is provided 112. A set of categories is identified with the set of URLs. The set of categories may be provided (e.g., by a content owner) or determined as in the following optional steps. The content or text, corresponding to the URLs, is classified 140, for example, using a text classifier, such as the text classifier 1000 (FIG. 9). Categories corresponding to the text classifications (determined at 140) are determined 142. One or more boost vectors are selected 160 based on the one or more categories. In other words, the method 150 makes use of a set of boost vectors previously generated or determined for each of a set of categories or classifications. As a result, one or more of these boost vectors may be selected once a set of one or more categories is determined. One or more search results are boosted 162 and the procedure ends 126. Boosting 162 changes the query scores corresponding to the one or more search results. Since search results are ordered based on the query scores of the search results, boosting 162 modifies an order in which the search results are provided, received or presented to the user, i.e., the rankings of one or more search results are changed. In some embodiments, the procedure shown in FIG. 1B may omit one or more operations, may reorder one or more operations or may include one or more additional operations.

In an exemplary embodiment, each search result has an information retrieval value, sometimes called a query score. The one or more search results are boosted by multiplying one or more of the information retrieval values by one or more weights 1114 (FIG. 10) in the search boost vector, such as search boost vector 1100 (FIG. 10). The search boost vector may be determined using the method 130 illustrated in FIG. 1A. In particular, the first set of URLs may be provided and the second set of URLs may be identified and/or determined in accordance with the one or more first categories.

Figure 2:
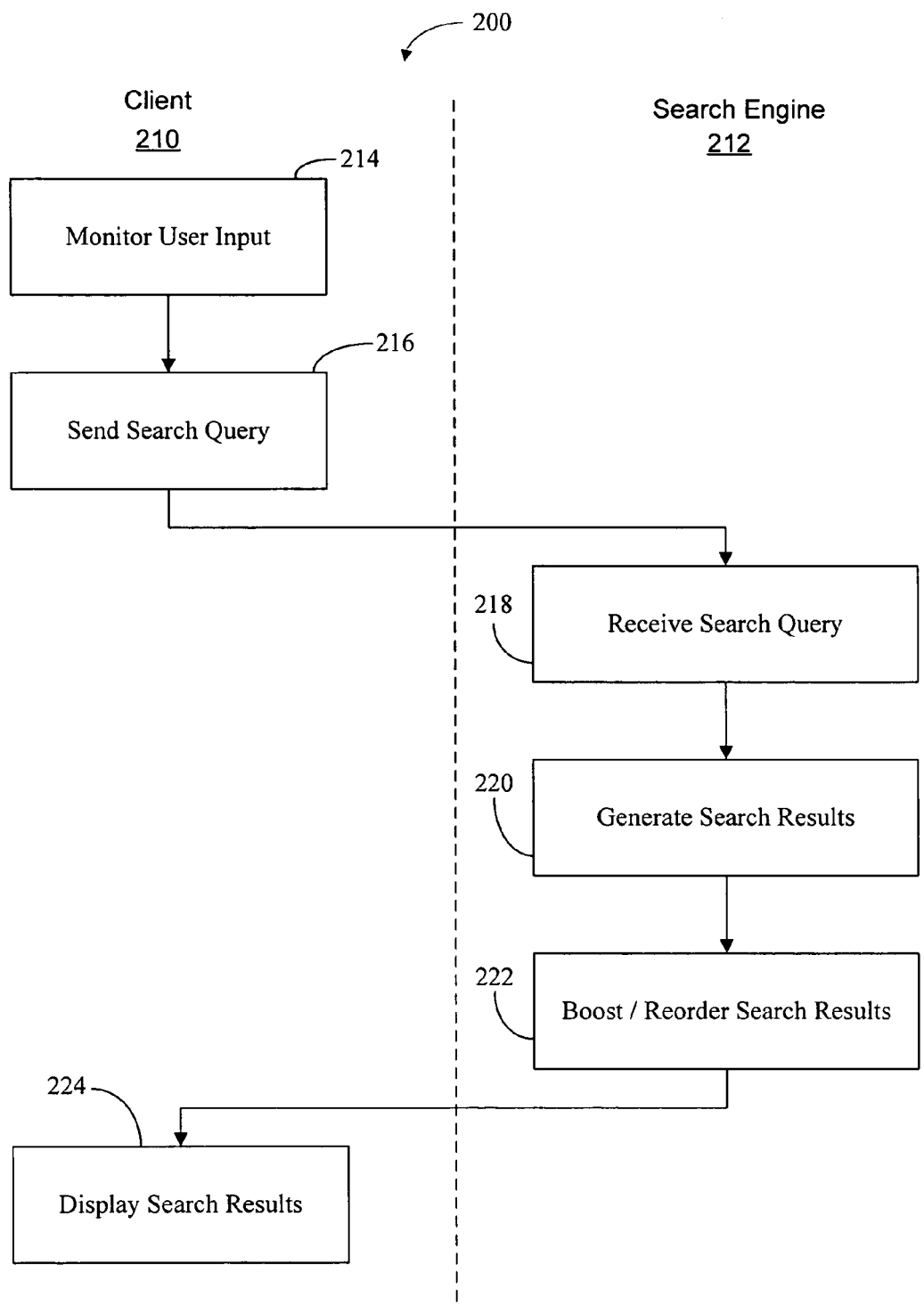
FIG. 2 is a flow chart of a method for using one or more search boost vectors to boost one or more search results from a search engine according to some embodiments of the invention.

FIG. 2 is a flow chart illustrating an embodiment of a method 200 for using one or more search boost vectors to boost one or more search results. At a client location 210, the user input to the search assistant is monitored 214. A search query is sent 216. A search engine 212 receives a search query 218. Search results are generated 220. One or more search results are boosted 222. Search results are displayed 224. In some embodiments, the procedure shown in FIG. 2 may omit one or more operations, may reorder one or more operations or may include one or more additional operations.

In some embodiments, boosting 222 may use one or more search boost vectors. In other embodiments, however, boosting may not use a boost vector. For example, in some embodiments, one or more search results matching a first set of URLs may be boosted 222. In still other embodiments, one or more search results may be boosted 222 based on one or more keywords in the one or more search results that match one or more keywords in a profile. In some embodiments, the keywords may be extracted from a set of documents (located, for example, at URLs), from prior search queries and/or from prior search results. The profile may be one or more user profiles and/or one or more content site profiles.

Figure 3:
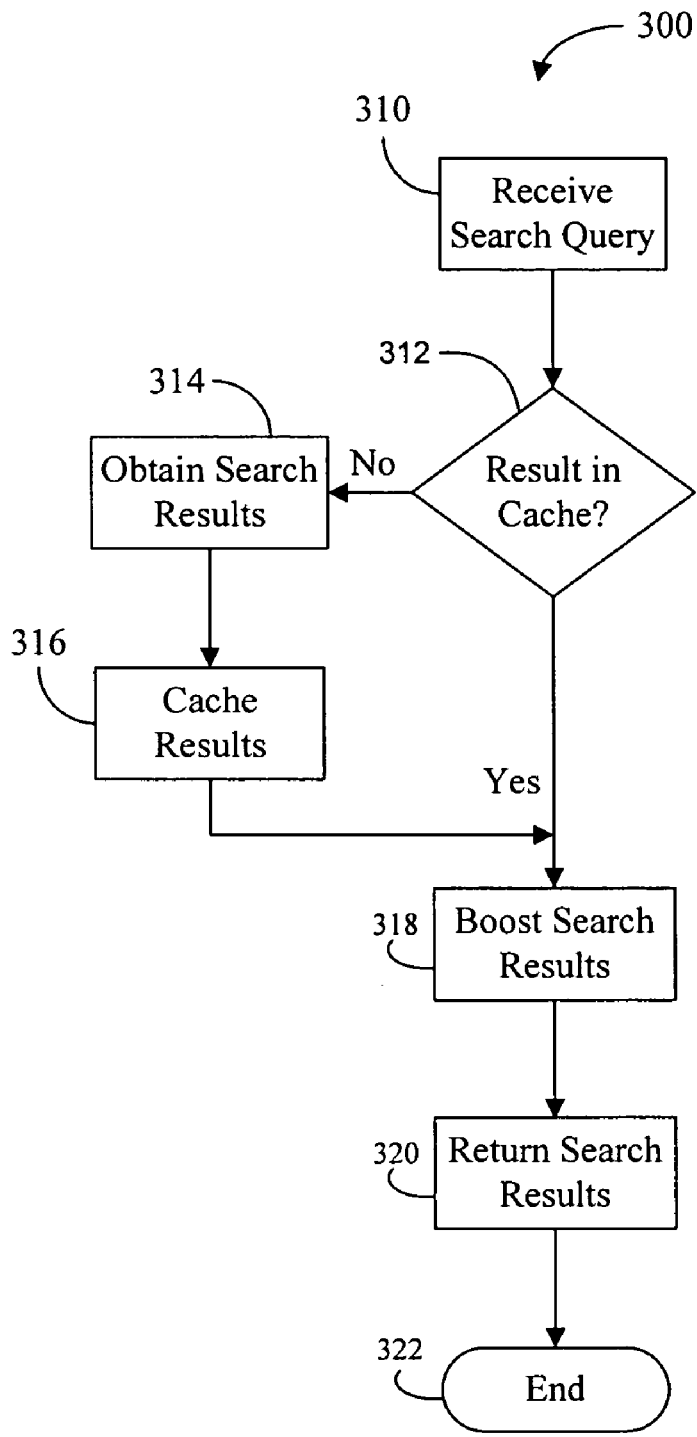
FIG. 3 is a flow chart of a method for using one or more search boost vectors to boost one or more search results from a search engine according to some embodiments of the invention.

FIG. 3 illustrates an embodiment of a method 300 for boosting one or more search results from a search engine, such as the search engine 212 (FIG. 2). In some embodiments, the boosting may use one or more search boost vectors. A search query is received 310. If search results for the search query are found in a search results cache 312, the one or more search results are boosted 318. If search results for the query are not in the cache 312, search results for the search query are obtained 314, cached 316 and boosted 318. The search results are returned 320 and the procedure ends 322. In some embodiments, caching 316 of the search results is optional, and a decision to cache or not cache the search results may be based on a score or other assessment indicating a likelihood of the same search query being processed again. While FIG. 3 illustrates boosting 318 in conjunction with caching or results 316, in other embodiments boosting 318 may be performed without caching results.

Figure 4:
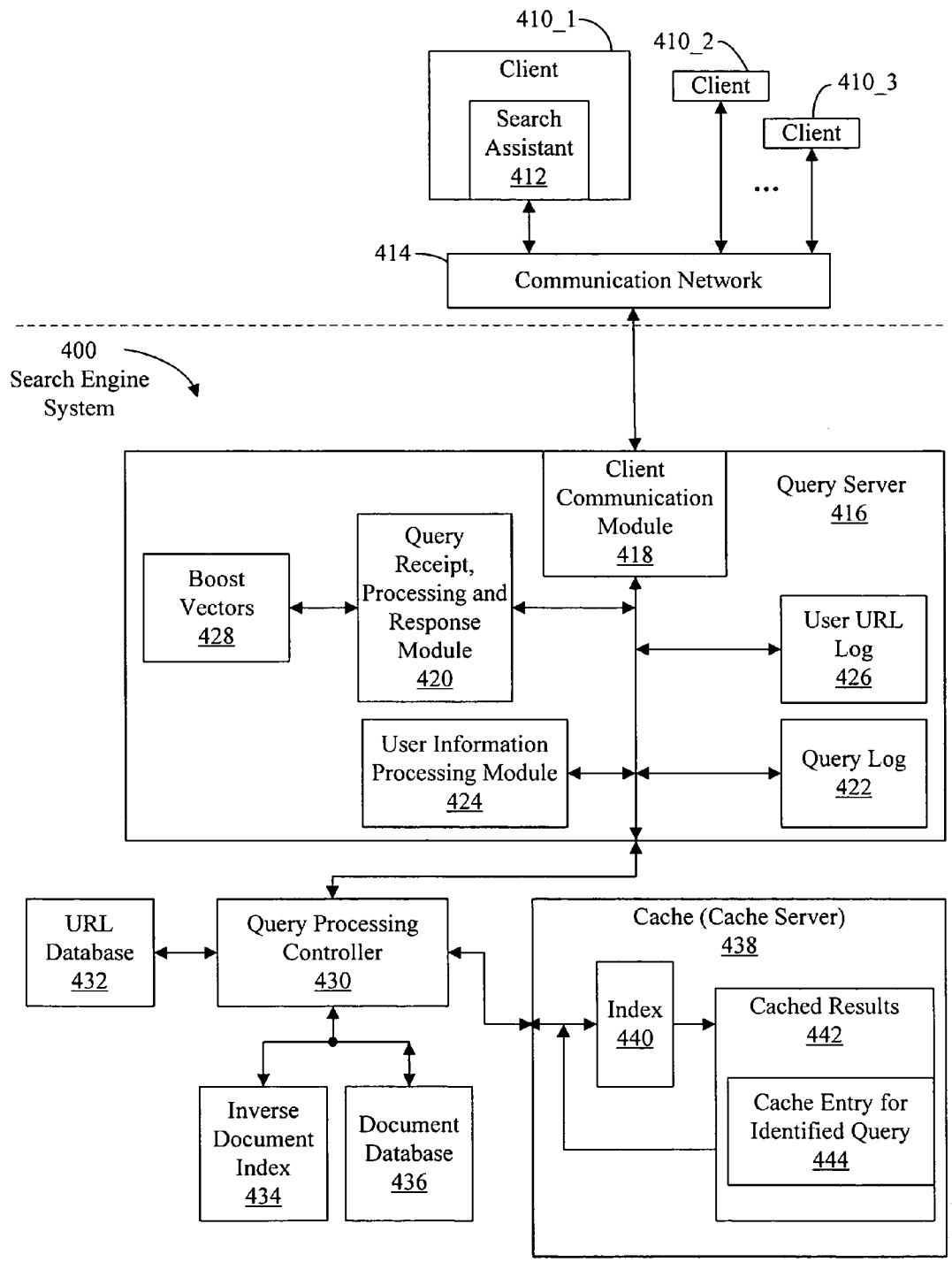
FIG. 4 is a block diagram of clients and a search engine according to some embodiments of the invention.

Attention is now given to hardware and systems that may be used to implement embodiments of methods for generating one or more search boost vectors, such as method 130 (FIG. 1A), and for boosting one or more search results, such as method 200 (FIG. 2). FIG. 4 is a block diagram illustrating an embodiment of a search engine system 400 that generates search results in response to search queries from one or more clients 410. Each client 410 may have a search assistant, such as search assistant 412. It should be appreciated that the layout of the search engine system 400 is merely exemplary and may take on any other suitable layout or configuration. The search engine system 400 is used to search an index of documents, such as billions of web-pages or other documents indexed by modern search engines.

Note that the search engine system 400 can be used as an Internet search engine, for locating documents on the WWW, or as an Intranet search engine, for locating documents stored on servers or other hosts within an Intranet. In addition, the methodology described herein is applicable to implementations where only portions of documents, such as titles and abstracts, are stored in the database of the search engine system 400.

The search engine system 400 may include multiple data centers each housing a backend. The data centers are generally widely dispersed from one another, such as across the continental United States. Search queries submitted by users at one of the clients 410 to the search engine system 400 are routed to an appropriate backend as part of the Domain Name System (DNS), based on current load, geographic locality and/or whether that datacenter is operating.

Each backend preferably includes multiple query servers, such as query server 416, coupled to a communications network 414. The communications network 414 may be the Internet, but may also be any local area network (LAN) and/or wide area network (WAN). In some embodiments, each query server 416 is a Web server that receives search query requests and delivers search results in the form of web pages via HTTP, XML or similar protocols. Alternatively, if the query server 416 is used within a LAN, i.e., internally and not by the public, it may be an Intranet server. In essence, the query servers, such as query server 416, are configured to control the search process, including searching a document index, analyzing and formatting the search results, including boosting one or more of the search results.

Each backend also preferably includes multiple query processing controllers, such as query processing controller 430, coupled to the multiple query servers, such as the query server 416. Each of the query processing controllers may be coupled to a cache 438, a URL database 432, an inverse document index 434 and a document database 436. Each query processing controller is configured to receive requests from one of the query servers, such as the query server 416, and transmit the requests to the cache 438, the URL database 432, the inverse document index 434 and the document database 436.

The cache 438 is used to increase search efficiency by temporarily storing previously located search results. The efficiency and cost of performing a search is dependent on a number of factors, such as the various combinations of terms and/or keywords used in the search query, the length of time spent on the search and the number of documents indexed. The average response time and cost of a search is lowered by storing the search results 442 of previously requested search queries in the temporary storage or cache 438 of the search engine system 400. One of the benefits of keeping a cache of commonly searched information is that it ensures a fast response to subsequent search queries for the same information, as it takes less time to retrieve the information from local memory. Another benefit of caching commonly searched information is to reduce the cost of servicing multiple search queries requesting the same information. When the result of a search is cached, there is no need to perform another search of the document database 436, which may be distributed over multiple disks and/or memory arrays on multiple remote computer servers. Retrieving such information from the multiple disks and memory arrays in multiple remote computer servers requires significantly more time and resources than retrieving the information from the cache 438. Instead, an index 440 contains a pointer to a cache entry corresponding to a current search query 444.

The search rank values for the documents in the search results are conveyed to the query processing controller 430 and/or the query server 416, and are used to construct an ordered search result list. Once the query processing controller 430 constructs the ordered search result list, the query processing controller 430 transmits to the document database 436 a request for snippets of an appropriate subset of the documents in the ordered search list. For example, the query processing controller 430 may request snippets for the first fifteen or so of the documents in the ordered search result list. The document database 436 constructs snippets based on the search query, and returns the snippets to the query processing controller 430. The query processing controller 430 then returns a list of located documents and snippets back to the query server 416. In some embodiments, the snippets are stored in the cache server 438 along with the cached results 442. As a result, in these embodiments the query processing controller 430 only requests snippets for documents, if any, for which it is unable to obtain valid cached snippets from the cache server 438.

The query server 416 has a client communication module 418 for communicating, using the communication network 414, with one or more of the clients 410. The query server 416 also may have a user URL log or user URL log 426, a query log 422, user information processing module 424, query receipt, processing and response module 420 and one or more search boost vectors 428. User information processing module 424 may store user preferences or profiles and/or content site profiles. User URL log 426 may store one or more URLs as well as corresponding time stamps for when the one or more URLs are visited. Storage of this information may be in the query server 416, and/or in one or more additional query servers, including one or more query servers at different locations.

In some embodiments, the query receipt, processing and response module 420 may determine one or more search boost vectors 428 using a method such as method 130 (FIG. 1A). The query receipt, processing and response module 420 may select one or more search boost vectors 428 based on one or more user preferences or profiles and/or one or more content site profiles. The query receipt, processing and response module 420 may boost one or more of the search results, i.e., the ranking in the list of located documents and snippets. The query server 416 then transmits the search results, or a portion of the search results, to the user requesting the search. In some embodiments, the boosting of search results is performed before snippet generation or retrieval from cache, because snippets are initially generated only for the top N (e.g., 10 to 25) search results, until a user requests a listing of lower ranked search results. By boosting the search results first and then generating or retrieving snippets, snippets are generated or retrieved only (or primarily) for search results conveyed to and/or presented to the requestor, thereby conserving the system resources used to generate snippets.

Figure 6:
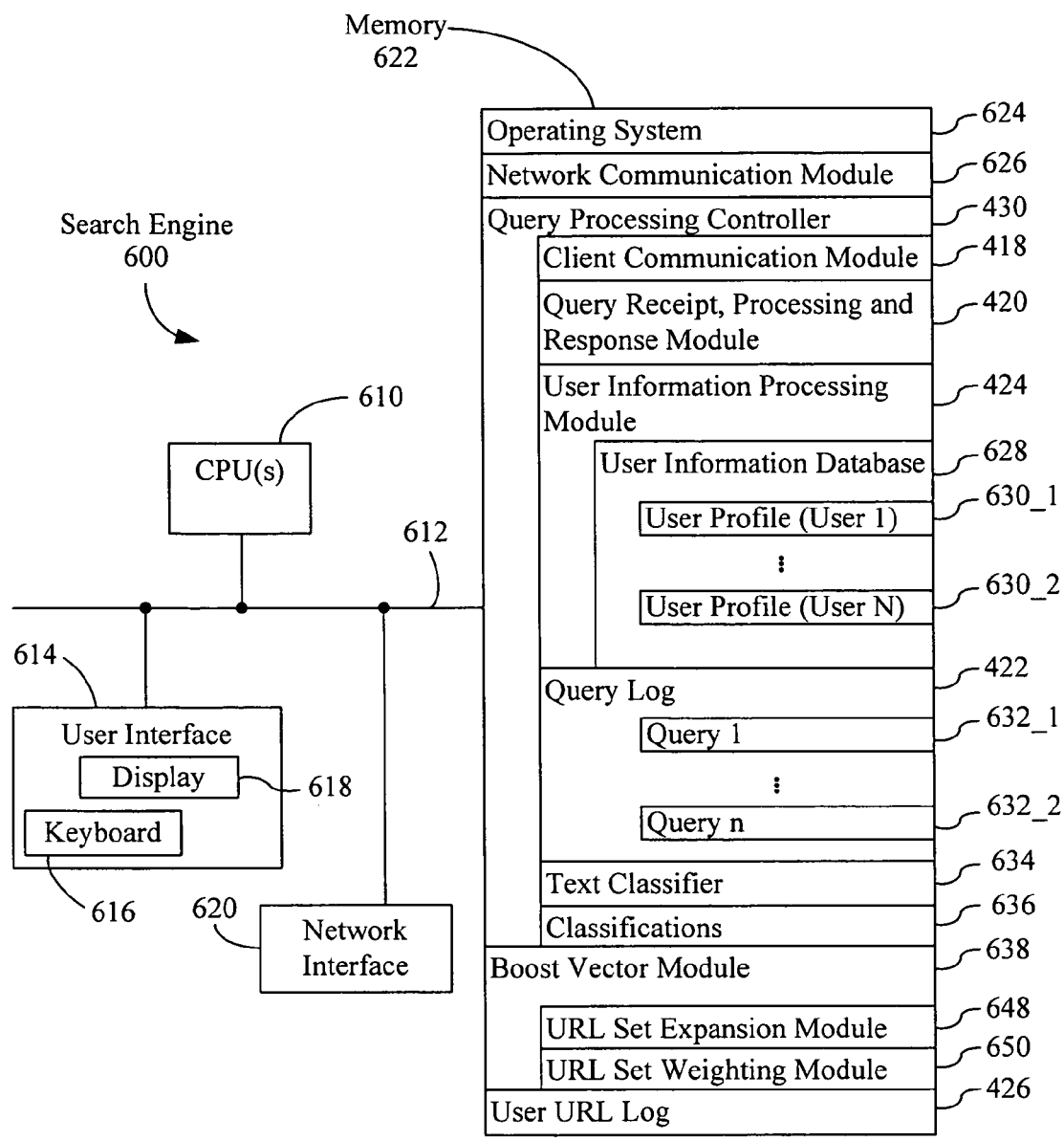
FIG. 6 is a block diagram of a search engine according to some embodiments of the invention.

FIG. 6 is a block diagram illustrating an embodiment of a search engine 600. The search engine 600 may include at least one data processor or central processing unit (CPU) 610, one or more optional user interfaces 614, a communications or network interface 620 for communicating with other computers, servers and/or clients, a memory 622 and one or more signal lines 612 for coupling these components to one another. The user interface 614 may have a keyboard/mouse 616 and/or a display 618. The one or more signal lines 612 may constitute one or more communications busses.

The memory 622 may include high-speed random access memory and/or non-volatile memory, such as one or more magnetic disk storage devices. The memory 622 may store an operating system 624, such as LINUX, UNIX or WINDOWS, that includes procedures for handling basic system services and for performing hardware dependent tasks. The memory 622 may also store communication procedures in a network communication module 626. The communication procedures are used for communicating with clients, such as the clients 410 (FIG. 4), and with other servers and computers in the search engine 600.

The memory 622 may also store the query processing controller 430. The query processing controller 430 includes the following elements, or a subset or superset of such elements: the client communication module 418, the query receipt, processing and response module 420, the user information processing module 424, the query log 422, a text classifier 634 and classifications 636. The user information processing module 424 may include a user information database 628 having one or more user profiles 630, such as user profile data structure 840 (FIG. 8C). The user information database 628 may also have one or more content site profiles, such as content site profile data structure 860 (FIG. 8D). The query log 422 may include one or more queries 632 and/or search query results.

The memory may include a text classifier 634, such as the text classifier 1000 (FIG. 9), and one or more classification data structures 636, such as category definition data structure 800 (FIG. 8A) and document dictionary data structure 820.

The memory 622 may also include a boost vector module 638 and the user URL log 426. User URL log 426 may include URL Log data structure 500 (FIG. 5). The boost vector module 638 may include URL set expansion module 648 and URL set weighting module 650. The URL set expansion module 648 and the URL set weighting module 650 may be used in the method 130 illustrated in FIG. 1A to generate one or more search boost vectors. In some embodiments, the boost vector module 638 may be contained within the query processing controller 430.

Although FIG. 6 (like FIG. 4) shows search engine 600 as a number of discrete items, FIG. 6 is intended more as a functional description of the various features which may be present in a search engine system rather than as a structural schematic of the embodiments described herein. In practice, and as recognized by those of ordinary skill in the art, the functions of the search engine 600 may be distributed over a large number of servers or computers, with various groups of the servers performing particular subsets of those functions. Items shown separately in FIG. 6 could be combined and some items could be separated. For example, some items shown separately in FIG. 6 could be implemented on single servers and single items could be implemented by one or more servers. The actual number of servers in a search engine system and how features, such as the query processing controller 430, are allocated among them will vary from one implementation to another, and may depend in part on the amount of information stored by the system and/or the amount data traffic that the system must handle during peak usage periods as well as during average usage periods.

Figure 7:
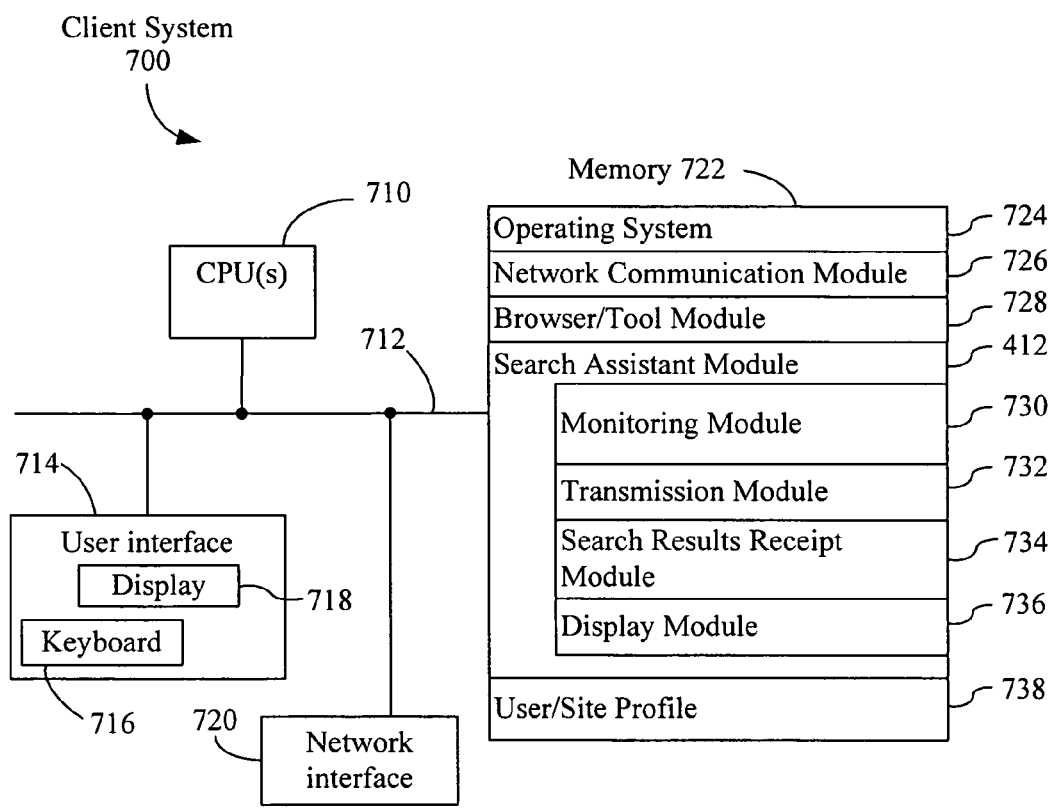
FIG. 7 is a block diagram of a client system according to some embodiments of the invention.

FIG. 7 illustrates a block diagram of an embodiment of a client system 700, such as those used by the clients 410 (FIG. 4). The client system 700 may include at least one data processor or central processing unit (CPU) 710, one or more optional user interfaces 714, a communications or network interface 720 for communicating with other computers, servers and/or clients, a memory 722 and one or more signal lines 712 for coupling these components to one another. The user interface 714 may have a keyboard/mouse 716 and/or a display 718. The one or more signal lines 712 may constitute one or more communications busses.

The memory 722 may include high-speed random access memory and/or non-volatile memory, such as one or more magnetic disk storage devices. The memory 722 may store an operating system 724, such as LINUX, UNIX or WINDOWS, that includes procedures for handling basic system services and for performing hardware dependent tasks. The memory 722 may also store communication procedures in a network communication module 726. The communication procedures are used for communicating with the search engine 600 (FIG. 6).

The memory may also include the following elements, or a subset or superset of such elements: a browser or browser tool module 728, the search assistant module 412 and one or more user or content site profiles 738. The profiles 738 may be generated, much like a cookie, by the search assistant module 412 by monitoring user activities or it may be generated remotely based on content of one or more URLs visited or associated with a user or content site. The search assistant module 412 may include the following elements, or a subset or superset of such elements: a monitoring module (or instructions) 730 for monitoring user input 214 (FIG. 2), a transmission module (or instructions) 732 for sending a search query 216 (FIG. 2), a search results receipt module (or instructions) 734 for receiving search results and a display module (or instructions) 736 for displaying search results 224 (FIG. 2). In embodiments where the client system 700 is coupled to a local server computer, one or more of the modules and/or applications in the memory 722 may be stored in a server computer at a different location than the user.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 722 (FIG. 7) or 622 (FIG. 6) may store a subset of the modules and data structures identified above. Furthermore, memory 722 or 622 may store additional modules and data structures not described above.

In some embodiments, the method 130 in FIG. 1A for determining one or more search vectors may be iterated. In these embodiments, one or more URLs in the first set of URLs and/or the second set of URLs may be used as a new first set of URLs for a subsequent iteration of the method 130.

In some embodiments, boosting of one or more search results may be accomplished, without using a search boost vector, in other ways than discussed previously. For example, additional terms or keywords may be added to a search query based on one or more user profiles and/or one or more content site profiles. Alternatively, the search may be modified in one or more query processing controllers, such as query processing controller 430 (FIG. 4). These additional embodiments, however, may require storing additional search results in the cache, or changing how results are stored in the cache 438 (FIG. 4). Such a modification could be cumbersome and may entail a very large memory overhead to store a large number of personalized search results for multiple users.

The foregoing descriptions of specific embodiments of the present embodiments are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   prior to receiving a search query,
   providing to a boost vector module a first set of content location identifiers for first content corresponding to one or more first categories;
   selecting a second set of content location identifiers for second content based on the one or more first categories, wherein the second content is predefined with respect to the one or more first categories;
   generating a personalized search boost vector including a set of weights corresponding to content location identifiers in the second set of content location identifiers; wherein the search boost vector identifies a plurality of content location identifiers in the second set and includes a respective weight for each of the identified content location identifiers; and
   storing the search boost vector in a computer readable storage medium.

2. The method of claim 1, further including:
   after receiving the search query:
   generating search results;
   selecting at least one search boost vector, including the stored search boost vector, from a set of stored search boost vectors;
   boosting, so as to reorder the search results, one or more of the search results using the one or more selected search boost vectors; wherein each boosted search result matches a respective content location identifier in at least one of the selected search boost vectors; and
   providing boosted search results.

3. The method of claim 1, further comprising:
   performing text classification on the first content to determine the one or more first categories corresponding to the first content.

4. The method of claim 3, wherein the one or more first categories are determined by applying a text classifier to the first content.

5. The method of claim 3, wherein the selecting identifying of the second set of content location identifiers includes accessing stored information relating predefined categories to content location identifiers.

6. The method of claim 1, further comprising:
   determining weights corresponding to content location identifiers in a set selected from the group consisting of the first set of content location identifiers, the second set of content location identifiers and the first and second set of content location identifiers.

7. The method of claim 1, wherein the second set of content location identifiers are selected from one or more existing sets of content location identifiers corresponding to one or more of the first categories.

8. The method of claim 1, wherein the selecting the second set of content location identifiers for the second content is further in accordance with one or more user profiles.

9. The method of claim 1, wherein the selecting the second set of content location identifiers for the second content is further in accordance with one or more content site profiles.

10. A method, comprising:
    prior to receiving a search query, storing a set of search boost vectors, wherein a respective search boost vector identifies a plurality of content location identifiers and includes a respective weight for each of the identified content location identifiers;
    after receiving the search query:
    receiving the search query;
    generating search results;
    selecting one or more search boost vectors from the set of stored search boost vectors in accordance with one or more categories, wherein the one or more categories correspond to the search query or a source of the search query;
    boosting, so as to reorder the search results, one or more of the search results using the one or more selected search boost vectors; wherein each boosted search result matches a respective content location identifier in at least one of the selected search boost vectors; and
    providing boosted search results.

11. The method of claim 10, wherein the selecting the one or more search boost vectors is further in accordance with one or more user profiles.

12. The method of claim 10, wherein the each search boost vector of the stored set of search boost vectors includes the set of content location identifiers corresponding to the set of weights in the search boost vector.

13. A computer-program product, comprising:
a computer readable storage medium and a computer program mechanism embedded therein, the computer program mechanism comprising:
instructions for providing to a boost vector module, prior to receiving a search query, a first set of content location identifiers for first content corresponding to one or more first categories;
instructions for selecting a second set of content location identifiers for second content based on the one or more first categories, wherein the second content is predefined with respect to the one or more first categories;
instructions for generating a personalized search boost vector including a set of weights corresponding to content location identifiers in the second set of content location identifiers;
wherein the search boost vector identifies a plurality of content location identifiers in the second set and includes a respective weight for each of the identified content location identifiers; and
instructions for storing the search boost vector in predetermined computer readable storage media.

14. The computer-program product of claim 13, further including:
instructions for generating search results;
instructions for selecting at least one search boost vector, including the stored search boost vector, from a set of stored search boost vectors;
instructions for boosting, so as to reorder the search results, one or more of the search results using the one or more selected search boost vectors; wherein each boosted search result matches a respective content location identifier in at least one of the selected search boost vectors; and
instructions for providing boosted search results.

15. The computer-program product of claim 13, further comprising:
instructions for performing text classification on the first content to determine the one or more first categories corresponding to the first content.

16. The computer-program product of claim 15, wherein the one or more first categories are determined by applying a text classifier to the first content.

17. The computer-program product of claim 15, wherein instructions for the selecting of the second set of content location identifiers includes accessing stored information relating predefined categories to content location identifiers.

18. The computer-program product of claim 13, further comprising:
instructions for determining weights corresponding to content location identifiers in a set selected from the group consisting of the first set of content location identifiers, the second set of content location identifiers and the first and second set of content location identifiers.

19. The computer-program product of claim 13, wherein the second set of content location identifiers are selected from one or more existing sets of content location identifiers corresponding to one or more of the first categories.

20. The computer-program product of claim 13, wherein the selecting the second set of content location identifiers for the second content is further in accordance with one or more user profiles.

21. The computer-program product of claim 13, wherein the selecting the second set of content location identifiers for the second content is further in accordance with one or more content site profiles.

22. A computer-program product, comprising:
a computer readable storage medium and a computer program mechanism embedded therein, the computer program mechanism comprising:
instructions for storing a set of search boost vectors prior to receiving a search query, wherein a respective search boost vector identifies a plurality of content location identifiers and includes a respective weight for each of the identified content location identifiers;
instructions for receiving the search query;
instructions for generating search results after receiving the search query;
instructions for selecting one or more search boost vectors from the set of stored search boost vectors in accordance with one or more categories, wherein the one or more categories correspond to the search query or a source of the search query;
instructions for boosting one or more of the search results using the one or more selected search boost vectors; wherein each boosted search result matches a respective content location identifier in at least one of the selected search boost vectors; and
instructions for providing boosted search results.

23. The computer-program product of claim 22, wherein the selecting the one or more search boost vectors is further in accordance with one or more user profiles.

24. The computer-program product of claim 22, wherein the selecting the one or more search boost vectors is further in accordance with one or more content site profiles, wherein each content site profile comprises one or more of a term-based profile, a link-based profile, and a category-based profile.

25. A computer, comprising:
a main memory;
a processor; and
a program, stored in the main memory and executed by the processor, the program including instructions for providing to a boost vector module, prior to receiving a search query, a first set of content location identifiers for first content corresponding to one or more first categories;
instructions for selecting a second set of content location identifiers for second content based on one the one or more first categories, wherein the second content is predefined with respect to the one or more first categories;
instructions for generating a personalized search boost vector including a set of weights corresponding to content location identifiers in the second set of content location identifiers;
wherein the search boost vector identifies a plurality of content location identifiers in the second set and includes a respective weight for each of the identified content location identifiers; and
instructions for storing the search boost vector in a computer readable storage medium.

26. The computer of claim 25, further including:
instructions for generating search results;
instructions for selecting at least one search boost vector, including the stored search boost vector, from a set of stored search boost vectors;
instructions for boosting, so as to reorder the search results, one or more of the search results using the one or more selected search boost vectors; wherein each boosted search result matches a respective content location identifier in at least one of the selected search boost vectors; and instructions for providing boosted search results.

27. The computer of claim 25, further comprising:

instructions for performing text classification on the first content to determine the one or more first categories corresponding to the first content.

28. The computer of claim 27, wherein the one or more first categories are determined by applying a text classifier to the first content.

29. The computer of claim 27, wherein instructions for the selecting of the second set of content location identifiers includes accessing stored information relating predefined categories to content location identifiers.

30. The computer of claim 25, further comprising:

instructions for determining weights corresponding to content location identifiers in a set selected from the group consisting of the first set of content location identifiers, the second set of content location identifiers and the first and second set of content location identifiers.

31. The computer of claim 25, wherein the second set of content location identifiers are selected from one or more existing sets of content location identifiers corresponding to one or more of the first categories.

32. The computer of claim 25, wherein the selecting the second set of content location identifiers for the second content is further in accordance with one or more user profiles.

33. The computer of claim 25, wherein the selecting the second set of content location identifiers for the second content is further in accordance with one or more content site profiles.

34. A computer, comprising:

a main memory;

a processor; and a program, stored in the main memory and executed by the processor, the program including instructions for storing a set of search boost vectors prior to receiving a search query, wherein a respective search boost vector identifies a plurality of content location identifiers and includes a respective weight for each of the identified content location identifiers;

instructions for receiving the search query;

instructions for generating search results after receiving the search query;

instructions for selecting one or more search boost vectors from the set of search boost vectors; in accordance with one or more categories; wherein the one or more categories correspond to the search query or a source of the search query;

instructions for boosting one or more of the search results using the one or more search boost vectors; wherein each boosted search result matches a respective content location identifier in at least one of the selected search boost vectors; and instructions for providing boosted search results.

35. The computer of claim 34, wherein the selecting the one or more search boost vectors is further in accordance with one or more user profiles.

36. The computer of claim 34, wherein the selecting the one or more search boost vectors is further in accordance with one or more content site profiles, wherein each content site profile comprises one or more of a term-based profile, a link-based profile, and a category-based profile.

37. A computer, comprising:

a main memory;

a processor; and a program, stored in the main memory and executed by the processor, the program including a boost vector module;

a means for providing to the boost vector module a first set of content location identifiers for first content corresponding to one or more first categories prior to receiving a search query;

a means for selecting a second set of content location identifiers for second content based on the one or more first categories, wherein the second content is predefined with respect to the one or more first categories; and a means for generating a personalized search boost vector including a set of weights corresponding to content location identifiers in the second set of content location identifiers;

wherein the search boost vector identifies a plurality of content location identifiers in the second set and includes a respective weight for each of the identified content location identifiers; and a means for storing the search boost vector in a computer readable storage medium.

38. A computer, comprising:

a main memory;

a processor; and a program, stored in the main memory and executed by the processor, the program including a means for storing a set of search boost vectors prior to receiving a search query, wherein a respective search boost vector identifies a plurality of content location identifiers and includes a respective weight for each of the identified content location identifiers;

a means for generating search results after receiving the search query;

a means for selecting one or more search boost vectors from the set of stored search boost vectors in accordance with one or more categories, where in the one or more categories correspond to the search query or a source of the search query;

a means for boosting, so as to reorder the search results, one or more of the search results using the one or more selected search boost vectors; wherein each boosted search result matches a respective content location identifier in at least one of the selected search boost vectors; and a means for providing boosted search results.

* * * * *